United States Patent
Ono et al.

(10) Patent No.: US 6,936,331 B2
(45) Date of Patent: Aug. 30, 2005

(54) POLYESTER FILM AND RECORDING TAPE

(75) Inventors: Masaaki Ono, Gifu (JP); Katsuya Okamoto, Otsu (JP); Kazuyoshi Fukata, Kusatsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/447,272

(22) Filed: May 29, 2003

(65) Prior Publication Data

US 2004/0043194 A1 Mar. 4, 2004

(30) Foreign Application Priority Data

May 30, 2002 (JP) .................................... 2002-157379

(51) Int. Cl.$^7$ ............................ B32B 5/16; G11B 5/733
(52) U.S. Cl. ............................. 428/143; 428/694 ML; 428/694 SG; 428/694 BR; 428/694 BF; 428/694 TR; 428/694 TS; 428/141; 428/143; 428/480; 428/481; 428/147
(58) Field of Search ............... 428/694 ML, 694 SG, 428/694 BR, 694 BF, 694 TR, 694 TS, 141, 143, 480, 481, 147

(56) References Cited

U.S. PATENT DOCUMENTS 5,306,538 A * 4/1994 Kurihara et al. ............ 428/141
5,830,557 A * 11/1998 Hayashi et al. ............. 428/143
6,242,077 B1 * 6/2001 Tojo et al. .................. 428/141
6,309,765 B1 * 10/2001 Suekane et al. ....... 428/694 TS

FOREIGN PATENT DOCUMENTS

| EP | 0 504 416 A1 | 9/1992 |
| EP | 0 916 484 A1 | 5/1999 |
| EP | 0 959 097 A2 | 11/1999 |

* cited by examiner

*Primary Examiner*—William P. Watkins, III
(74) *Attorney, Agent, or Firm*—Kubovcik & Kubovcik

(57) ABSTRACT

A polyester film comprising a coating layer which comprises organic fine particles and organic compounds on one-side surface of the polyester film, the weight ratio of the organic fine particles to the organic compounds in the coating is 1:0.2 to 1:5.0, the diameters of surface protrusions on the coating surface are 20 to 60 nm, the number of surface protrusions on the surface of the coating layer is 3 million to 100 million per square millimeter, and the surface roughness Ra of the coating surface is 0.5 to 1.9 nm, is suitable as a base film of a recording medium having excellent image quality and excellent durability without shaving an MR head.

12 Claims, No Drawings

POLYESTER FILM AND RECORDING TAPE

BACKGROUND OF THE INVENTION

1. Field of the Invention

The present invention relates to a polyester film. Furthermore, the present invention relates to a polyester film for a recording medium preferably used as a polyester film for a magnetic recording medium or a polyester film for an optical recording tape. In particular, the polyester film of the present invention is preferably used as a polyester film for a magnetic recording medium in order to improve a playback output and durability in repetitive playback of a ferromagnetic metal thin film type magnetic recording medium to record digital data for digital video cassette tapes, data storage tapes and the like.

2. Description of the Related Art

In a consumer digital video tape commercialized in 1995, a metallic, magnetic thin film of Co is provided on a base film of 6 to 7 $\mu$m thickness by vapor evaporation, and the surface thereof is coated with a diamond-like carbon layer. The consumer digital video tape has a record time of one hour in a standard specification (SD specification) in the case of a camcorder using a DV mini-cassette.

This digital video cassette (DVC) is the world's first consumer digital video cassette, and is valued highly in the market from the following viewpoints.

(1) Enormous amounts of information can be recorded regardless of a small body.
(2) Since signals do not degrade, image quality and sound quality do not degrade even after a lapse of many years.
(3) Since no interference is caused by noises, high image quality and high sound quality can be enjoyed.
(4) Images are not degraded by repetition of dubbing.

Polyester films described below are used as base films of consumer digital video tapes.

(a) A polyester film composed of a polyester film and a discontinuous coating layer which is adhered to at least one-side surface of the film and which primarily contains a polymer blend and fine particles having particle diameters of 50 to 500 angstroms, wherein the discontinuous coating layer contains a water-soluble polyester copolymer, and fine protrusions are provided on the discontinuous coating layer by the fine particles (Japanese Patent Publication of Examined Application No. 63-57238).

(b) A polyester film in which a continuous thin layer containing fine particles having an average particle diameter of 0.1 $\mu$m or less is provided as a primer of a magnetic layer by coating on the surface of the polyester film, and the thin layer includes fine protrusions due to the fine particles and fine protrusions-simply due to a binder resin (Japanese Unexamined Patent Application Publication No. 5-287101).

(c) A polyester film in which a continuous thin layer containing fine particles having an average particle diameter of 0.1 $\mu$m or less is provided as a primer of a magnetic layer by coating on the surface of the polyester film, and the thin layer includes fine protrusions due to fine particles having an average particle diameter of less than 0.06 $\mu$m, large protrusions due to particles having an average particle diameter of 0.06 $\mu$m or more and fine protrusions simply due to a binder resin (Japanese Unexamined Patent Application Publication No. 5-298670).

In the fall of 2001, a new video standard was established on a camcorder which was a further miniaturized, lightweight camcorder, which was easily portable, and which was able to be directly connected to the internet without through a computer. This new video standard includes a record time of one hour while the capacity ratio of the size thereof to that of a DV mini-cassette based on the MICRO MV standards is 30%. This video standard is digital recording using the same evaporation tape as that of the DVC. The image compression system of this video standard is not the DV compression based on the DVC standards, but MPEG2 compression. The tape width is changed from 6.35 mm to 3.8 mm, the minimum recording wavelength is changed from 0.49 $\mu$m to 0.29 $\mu$m, the track pitch is changed to 5 $\mu$m from 10 $\mu$m of DV and 6.7 $\mu$m of DVLP, and therefore, the packing density is significantly increased. A magnetic layer of the evaporation tape matching this new video standard has a significantly reduced film thickness. The Co oxide layer thickness of the MICRO MV tape is significantly reduced to 50 nm compared with the Co oxide layer thickness of the DVC of 160 to 220 nm.

High-packing-density recording and playback can be performed by the new video standard. This is because an MR head (magnetoresistive head) used for a hard disk is adopted for playback.

The MR head takes advantage of the phenomenon in which when a magnetic field is applied to a metal thin layer, the electrical resistance thereof is changed, and the playback output is large. However, the following problems have been made clear.

Regarding the MICRO MV tape prepared from the polyester film in the above-mentioned (a), image defects (dropouts) are very likely to occur. Regarding the MICRO MV tape prepared from the polyester film in the above-mentioned (a), the running life of the MR head is significantly reduced to about 100 hours with respect to continuous playback, and therefore, the MR head must be frequently exchanged.

Regarding the MICRO MV tape prepared from the polyester film in the above-mentioned (b) or (c), image defects (dropouts) are very likely to occur.

Furthermore, when the polyester film in the above-mentioned (c) is used, the MR head must be frequently exchanged approximately every 10 hours with respect to continuous playback.

SUMMARY OF THE INVENTION

In order to overcome the above-mentioned problems, a polyester film of the present invention is suitable for preparation of a magnetic tape in which image defects (dropouts) are reduced, and which is unlikely to cause shaving and abrasion of the MR head even when the magnetic tape serves as a magnetic tape for digital recording, e.g. a MICRO MV tape having significantly high packing-density with a track pitch of 6 $\mu$m or less.

A recording tape of the present invention becomes a magnetic tape in which image defects (dropouts) are reduced, and which is unlikely to cause shaving and abrasion of the MR head even when the magnetic tape serves as a magnetic tape for digital recording, having significantly high packing-density.

A polyester film of the present invention comprises a coating layer which comprises organic fine particles and organic compounds on one-side surface of the polyester film, the weight ratio of the organic fine particles to the organic compounds in the coating is 1:0.2 to 1:5.0, the diameters of surface protrusions on the surface of coating layer are 20 to 60 nm, the number of surface protrusions on the surface of coating layer is 3 million to 100 million per square millimeter, and the surface roughness Ra of the coating surface is 0.5 to 1.9 nm. In the polyester film of the present invention, preferably, the number of surface protrusions having heights of 20 nm or more on the surface of the coating layer is 1,000 per square millimeter or less, and the degree of aggregation of the surface protrusions is less than 10%.

DESCRIPTION OF THE PREFERRED EMBODIMENTS

The polyester film in the present invention becomes a high-strength film by molecular orientation. Preferably, the polyester of the present invention is polyethylene terephthalate or polyethylene-2,6-naphthalate, in which 80% or more of the components thereof is ethylene terephthalate or ethylene naphthalate. In the polyester of the present invention, examples of polyester copolymer components other than ethylene terephthalate and ethylene naphthalate include, for example, diol components, e.g. diethylene glycol, propylene glycol, neopentyl glycol, polyethylene glycol, p-xylylene glycol and 1,4-cyclohexanedimethanol, dicarboxylic acid components, e.g. adipic acid, sebacic acid, phthalic acid, isophthalic acid and 5-sodium sulfoisophthalic acid, multifunctional dicarboxylic acid components, e.g. trimellitic acid and pyromellitic acid, and p-oxyethoxybenzoic acid.

The polyester of the present invention may further contain at least one of sulfonic acid alkali metal salt derivatives having no reactivity with the polyester, polyalkylene glycols substantially insoluble in the polyester, and the like at a content in the order of 5% by weight or less.

A polyester film comprises a coating layer which comprises organic fine particles and organic compounds on one-side surface of the polyester film, the weight ratio of the organic fine particles to the organic compounds in this coating layer is 1:0.2 to 1:5.0, the diameters of surface protrusions on the surface of the coating layer are 20 to 60 nm, the number of surface protrusions on the surface of the coating layer is 3 million to 100 million per square millimeter, and the surface roughness Ra of the surface of coating layer is 0.5 to 1.9 nm.

Preferably, the weight ratio of the organic fine particles to the organic compounds in the coating layer containing the organic fine particles and the organic compounds, provided on one-side surface of the polyester film, is 1:0.8 to 1:3.2. Preferably, the diameters of surface protrusions on the coating surface are 25 to 45 nm. Preferably, the number of surface protrusions on the surface of the coating layer is 5 million to 80 million per square millimeter. Preferably, the surface roughness Ra of the surface of the coating layer is 0.7 to 1.6 nm.

Regarding the polyester film of the present invention, abrasion of a ferromagnetic metal thin layer, which may be provided on the surface of the coating layer by vacuum evaporation, to a magnetic head during recording and playback is reduced by fine surface protrusions. Since the fine surface protrusions of the polyester film of the present invention are formed from organic fine particles, the MR head is unlikely to be shaved during playback of a magnetic tape.

When the diameters of surface protrusions on the one-side surface of the polyester film are less than 20 nm or when the number of surface protrusions on the one-side surface of the polyester film is less than 3 million per square millimeter, since the magnetic layer surface of the magnetic tape is excessively smooth, the ferromagnetic metal thin layer becomes excessively smooth, and therefore, the running durability of the magnetic tape with respect to the magnetic head is reduced. When the diameters of surface protrusions on the one-side surface of the polyester film exceed 60 nm or when the number of surface protrusions on the one-side surface of the polyester film exceeds 100 million per square millimeter, since the magnetic layer surface of the magnetic tape becomes excessively rough, dropouts in the magnetic tape are increased.

When the amount of the organic compounds is less than the amount of the organic compounds corresponding to the weight ratio of the organic fine particles to the organic compounds in the coating layer on the one-side surface of the polyester film of 1:0.2, the organic fine particles are nonuniformly present on the surface of the film, the organic fine particles become likely to aggregate, and therefore, the aggregation of the organic fine particles is likely to shave the MR head during playback of the magnetic tape. On the contrary, when the amount of the organic compounds exceeds the amount of the organic compounds corresponding to the weight ratio of the organic fine particles to the organic compounds in the coating on the one-side surface of the polyester film of 1:5.0, since the organic fine particles are buried in the coating layer of organic compound, the height of the protrusions are reduced, the magnetic layer surface of the magnetic tape becomes smooth, the ferromagnetic metal thin layer becomes excessively smooth, and therefore, the running durability of the magnetic tape with respect to the magnetic head is reduced.

When the surface roughness Ra of the surface of coating layer on the one-side surface of the polyester film is less than 0.5 nm, since the magnetic layer surface of the magnetic tape is excessively smooth, the ferromagnetic metal thin layer becomes excessively smooth, and therefore, the running durability of the magnetic tape with respect to the magnetic head is reduced. When the surface roughness Ra exceeds 1.9 nm, since the magnetic layer surface of the magnetic tape becomes excessively rough, dropouts in the magnetic tape are increased.

Preferably, the heights of the surface protrusions provided on the one-side surface of the polyester film are less than 20 nm, and therefore, the surface protrusions are fine surface protrusions. More preferably, the heights are 16 nm or less. That the heights of the surface protrusions are less than 20 nm refers to that the heights of most of the surface protrusions are less than 20 nm, and the number of surface protrusions having heights of 20 nm or more is 1,000 per square millimeter or less. Preferably, the number of surface protrusions having heights of 20 nm or more is 630 per square millimeter or less. When the number of surface protrusions having heights of 20 nm or more exceeds 1,000 per square millimeter, since the magnetic layer surface of the resulting magnetic tape becomes excessively rough, undesirably, dropouts in the magnetic tape may tend to increase.

Preferably, the degree of aggregation of the surface protrusions provided on the one-side surface of the polyester film is less than 10%, and more preferably, is 5% or less. When the degree of aggregation is 10% or more, undesirably, the aggregation is likely to shave the MR head during playback of the magnetic tape.

Preferably, the organic compounds constituting the coating provided on the one-side surface of the polyester film is composed of a cellulose derivative and a fluorine-based surfactant. Preferably, the weight ratio of the cellulose derivative to the fluorine-based surfactant is 100:1 to 100:25, and more preferably, is 100:2 to 100:10.

Preferably, the cellulose derivative is contained in the coating layer of the present invention. The polyester film of the present invention can prevent polyester oligomers present in the polyester film from causing precipitation of oligomers onto the film surface with time by containing the cellulose derivative. Preferably, the fluorine-based surfactant is further contained. By containing the fluorine-based surfactant, the surface protrusions due to the organic fine particles can be uniformly provided on the film surface with excellent distribution without aggregation, and blocking between the surface of coating layer and the reverse-side surface of the film can be prevented.

When the weight of the fluorine-based surfactant used in the coating layer of the polyester film is more than or equal to the weight of the fluorine-based surfactant corresponding to the weight ratio of the cellulose derivative to the fluorine-based surfactant in the coating layer of 100:1, desirably, the organic compound fine particles are unlikely to aggregate, the MR head is unlikely to be shaved by the aggregation during playback of the magnetic tape, the blocking between the coating layer and the reverse-side surface of the film is unlikely to occur, and dropouts in the magnetic tape are unlikely to increase. When the weight of the fluorine-based surfactant used is less than or equal to the weight of the fluorine-based surfactant corresponding to the weight ratio of the cellulose derivative to the fluorine-based surfactant in the coating of 100:25, desirably, adhesion strength between the film and the coating layer is enhanced, the coating layer is unlikely to peel off, the total magnetic layer is unlikely to peel off the polyester surface during running as the magnetic tape with respect to the magnetic head.

As the cellulose derivative in the coating layer of the polyester film of the present invention, methyl cellulose, carboxymethyl cellulose, hydroxypropylmethyl cellulose, acetyl cellulose, hydroxyethylmethyl cellulose and the like can be used.

As the fluorine-based surfactant in the coating layer of the polyester film of the present invention, any one of nonionic, anionic, cationic and amphoteric surfactants including a fluorine atom in a molecule can be used. The fluorine-based surfactants may be any one of surfactants including a perfluoroalkyl group, surfactants in which fluorine atoms have substituted for all of or a part of hydrogen atoms in a molecule, and the above-mentioned surfactants containing a fluorine compound, e.g. ethylene-tetrafluoroethylene copolymers, polytetrafluoroethylenes and potassium fluoride. Specifically, perfluoroalkyl-group-containing fluorine-based surfactants, e.g. perfluoroalkyl sulfonates, perfluoroalkyl carbonates, perfluoroalkyl ethylene oxide adducts, perfluoroalkyl trimethylammonium salts and perfluoroalkyl aminosulfonates, can be used, although not limited to them.

As the organic fine particles constituting the surface protrusions provided on the polyester film surface of the present invention, organic compound particles of polyacrylic acids, polystyrenes, polyethylenes, polyesters, polyacrylates, poly(methyl methacrylate)s, polyepoxy resins, polyvinyl acetates, acryl-styrene copolymers, acrylic copolymers, various modified acrylic resins, styrene-butadiene copolymers and various modified styrene-butadiene copolymers, particles in which cores of inorganic particles, e.g. silica, alumina and calcium carbonate, are coated with an organic macromolecule, or the like can be used, although not limited to them. Preferably, the organic compound has terminal groups modified with epoxy, amine, carboxylic acid, hydroxyl group or the like, and has a self-cross-linking property.

In order to prevent occurrence of damage on the coating layer during processing and handling of the polyester film, preferably, a silicone compound is further contained in the coating layer on the polyester film surface of the present invention. In order to prevent occurrence of damage by improvement of the smoothness and slip of the coating, preferably, the silicone compound is contained at a content that allows the weight ratio of the cellulose derivative the fluorine-based surfactant: silicone compound to become 100:[1 to 25]:[0.1 to 1]. As the silicone compound, polydimethylsiloxane is used, for example.

Preferably, the Ra value of the surface on the reverse side of the surface provided with the coating layer containing the organic fine particles and the organic compounds of the polyester film of the present invention is 8 to 50 nm, and more preferably, is 10 to 45 nm. When the Ra value of the surface on the reverse side of the surface provided with the coating containing the organic compound fine particles and the organic compounds is 8 to 50 nm, after the polyester film is prepared, a product in a good winding shape is easily taken during slitting of the polyester film into a predetermined width. In addition to this, when a ferromagnetic thin film layer is provided on the surface of coating layer on one side of the polyester film, followed by taking up into the shape of a roll, occurrence of wavy deformation in the ferromagnetic thin layer due to transfer of the roughness of the one-side surface B to the reverse-side surface can be reduced to a minimum.

Preferably, on the surface of the reverse side of the surface provided with the coating layer containing the organic fine particles and the organic compounds of the polyester film of the present invention, a coating layer rougher than the surface provided with the coating layer containing the organic fine particles and the organic compounds is provided, although not specifically limited to this. Preferably, a coating layer containing a lubricant, e.g. silicone, a layer formed by further laminating a polyester film layer containing larger fine particles, or a layer in which the above-mentioned coating layer is further provided thereon is used for the surface on the reverse side of the surface provided with the coating containing the organic fine particles and the organic compounds. Examples of fine particles used here include, for example, calcium carbonate, silica, alumina and polystyrene. Preferably, these fine particles have an average particle diameter of 100 to 1,000 nm, and more preferably, 110 to 900 nm. Preferably, the amount of addition thereof is 0.05% to 1.0% by weight, and more preferably, is 0.08% to 0.8% by weight.

Preferably, the film thickness of the polyester film of the present invention is less than 10 µm, and more preferably, the thickness is 3.5 to 9.0 µm.

Preferably, the polyester film of the present invention is used for a recording medium, and more preferably, is used for a magnetic recording medium or an optical recording medium.

In order to use the polyester film of the present invention for a magnetic recording medium, a ferromagnetic metal thin layer is provided on the one-side surface of coating layer. Furthermore, preferably, a back coat layer is provided on the reverse surface of the surface provided with the ferromagnetic metal thin layer, the back coat layer is composed of solid fine particles and a binder, and is formed by application of a solution containing various additives on an as needed basis. Known materials can be used for the solid fine particles, the binder and the additives used in the back coat layer, and are not specifically limited. Preferably, the thickness of the back coat layer is in the order of 0.3 to 1.5 µm.

Next, an example of a method for manufacturing the polyester film and the magnetic recording tape of the present invention will be described.

The polyester film of the present invention uses polyester containing particles at a minimum content as a material for the one-side surface (hereafter referred to as surface A), and is manufactured by a conventional manufacturing process for plastic film, composed of melting, molding, biaxial orientation and thermal heat-set. In the drawing step, the polyester film of the present invention is drawn at 90 to 140° C. in the longitudinal direction by a factor of 2.7 to 5.5, and in the transverse direction by a factor of 3.5 to 7.0, followed by thermal heat-set at 190 to 220° C. Furthermore, the following operations are performed, so that the film can be manufactured.

(1) The surface A side of the smooth polyester film after drawing in the one direction is coated with a coating solution containing the organic fine particles at a content of 0.5 to 12.0% by weight, preferably, at a content of 0.6 to 10.0% by weight, and a cellulose derivative and a fluorine-based surfactant as the organic compounds, so that a coating layer is provided on the surface A side, and surface protrusions are provided on the surface A side. The weight ratio of the organic compound fine particles to the organic compounds is 1:0.2 to 5.0, and the weight ratio of the cellulose derivative to the fluorine-based surfactant is 100:1 to 25. The number of the surface protrusions and the surface roughness of the coating surface can be controlled by adjusting the sort, the average particle diameter and the solid coating concentration of the fine particles.

(2) Surface protrusions having heights of 20 nm or more are substantially eliminated, and the degree of aggregation of the surface protrusions is controlled at 10% or less, by the following method.

The degree of aggregation of the surface protrusions can be controlled at 10% or less by using organic particles as the fine particles in the coating and by controlling the weight concentration of the organic fine particles in the coating solution at 45% by weight or less.

The heights of the surface protrusions can be controlled by using organic particles having an average particle diameter of 10 to 55 nm and a glass transition temperature of 0 to 90° C., by performing transverse drawing at a temperature higher than or equal to the glass transition temperature of the organic particles, and by adjusting the particle diameters of the organic particles during the coating, the glass transition temperature of the organic particles and the drawing temperature. When the drawing after coating is performed at a temperature higher than or equal to the glass transition temperature of the organic particles, the fine particles become likely to flow during the drawing, the diameters of the fine particles are increased, and the heights of the fine particles are reduced, so that the heights of the surface protrusions can be reduced to 20 nm or less.

A co-extrusion technique may be used, a material for the above-mentioned layer A and a material intentionally containing large fine particles for the layer B may be used, and an A/B laminated film may be formed by melt extrusion. The layer B may not be used. The surface B side, which is the reverse side of the above-mentioned surface A side, may be coated with a coating solution containing a lubricant in order that the surface B side may be subjected to a treatment for improving slip. Alternatively, the layer B may be used, and furthermore, the surface B side may be subjected to a treatment for improving slip by application of the coating solution containing the lubricant.

The biaxial orientation can be performed by, for example, a sequential biaxial orientation method and a simultaneous biaxial orientation method. On an as needed basis, drawing may be further performed before the thermal heat-set in the longitudinal or transverse direction or in the longitudinal and transverse direction in order that so-called enhanced type biaxial orientation is performed for increasing mechanical strength.

When the polyester film of the present invention is used as a base film for a magnetic recording medium using an MR head as a reading head, in particular for application to digital video tapes and for application to data storage tapes, a magnetic recording medium having excellent performances is provided, and therefore, the polyester film of the present invention is suited therefor.

The polyester film of the present invention provided with an alloy thin film for recording image data, while the alloy is composed of optically reactive Ge, Sb, Te and the like, is suitable for the use as a base film of an optical recording tape capable of recording image data and the like.

When the recording tape of the present invention is used as a magnetic recording tape, a ferromagnetic metal thin layer is provided on the surface A of the polyester film of the present invention by vacuum evaporation, and shaping is performed into the shape of a tape. When used as the magnetic recording tape, known metal thin layers can be used, and the material used therefor is not specifically limited. However, preferably, the metal thin layer is made of iron, cobalt, nickel or a ferromagnetic alloy thereof. Preferably, the thickness of the metal thin layer is 20 to 70 nm in order to prevent saturation of the MR reading output. When the thickness of the metal thin layer is less than 20 nm, the playback output signal from the magnetic tape may be too weak, and sometimes, the recording signal cannot be read out. When the thickness of the metal thin layer exceeds 70 nm, the playback output signal may be too strong, MR head reading signal strength may be saturated, and sometimes, undesirably, reading of the record becomes impossible.

When the recording tape of the present invention is used as a magnetic recording tape, a ferromagnetic metal thin layer made of Co, for example, is provided on the coating on the one-side surface of the polyester film of the present invention by vapor evaporation so as to have a film thickness of 20 to 70 nm, this metal thin layer is coated with a diamond-like carbon film having a thickness in the order of 10 nm, and a lubricant is further applied thereon. On the other hand, the other surface is coated with a solution composed of solid fine particles, a binder, and various additives on an as needed basis, so as to provide a back coat layer. Subsequently, cutting into a predetermined tape width is performed, and therefore, the recording tape can be manufactured.

The polyester film of the present invention can be made into a polyester film for a magnetic recording medium capable of manufacturing a magnetic tape suitable for an MR head, having excellent image quality and excellent running durability without shaving an MR head. This invention is effective for commercialization of mounting of the MR head on a camcorder.

Furthermore, the polyester film of the present invention is suitable for the use as a base film of the optical recording tape.

EXAMPLES

Methods for measurements used in the present examples will be described below.

(1) Diameter of Surface Protrusion on the Film

The film surface was observed with a scanning electron microscope at a magnification of 50 thousand times with respect to 5 visual fields, 10 protrusions were randomly selected among visually identified protrusions in each visual field, an average value of a maximum diameter and a minimum diameter of each protrusion was defined as the average diameter of each protrusion, and an average value of diameters of 50 protrusions was defined as the diameter of the surface protrusion on the film.

(2) The Number of Surface Protrusions on the Film

The film surface was observed with a scanning electron microscope at a magnification of 50 thousand times with respect to 10 visual fields or more, the number of visually identified protrusions per square millimeter is determined, and thereby, the number of surface protrusions on the film was measured.

(3) Degree of Aggregation of Surface Protrusions on the Film

Observation was performed in a manner similar to that for the number of surface protrusions on the film in the above-mentioned (2). Among the visually identified protrusions, the total number of the protrusions in contact with each other and the protrusions in close vicinity to each other at a distance in the order of one-quarter or less than the maximum diameter of the protrusion was determined, the total number was divided by the number of all protrusions, the result was multiplied by 100, and the resulting value was defined as the degree of aggregation of the surface protrusions on the film.

(4) The Number of Surface Protrusions having Heights of 20 nm or More on the Film The number of surface protrusions having heights of 20 nm or more on the film was measured using an atomic force microscope (scanning probe microscope). A region 40 $\mu$m square in the film surface was subjected to scanning for an atomic force microscope measurement at a damping mode using a desktop small probe microscope (Nanopics 1000) manufactured by Seiko Instruments Inc. A sectional diagram in the Z axis direction was prepared based on the resulting profile curve of the surface. A minimum height was assumed to be 0 nm, and the number of protrusions having heights of 20 nm or more was determined and was converted to the number per square millimeter. The resulting value was defined as the number of protrusions having heights of 20 nm or more on the film. The in-plane-direction magnification was set at in the order of 5 thousand times, and the height-direction magnification was set at in the order of a million times. The number of n was 5. Regarding the present method for measurement, the limit of measurement of the height is about 100 nm.

(5) Ra Value

The surface roughness Ra value of the film was measured using the atomic force microscope (scanning probe microscope) described in (4). The measurement area was a range 4 $\mu$m square, and Ra was determined from the arithmetic average surface roughness corresponding to Ra in JIS B0601, based on the resulting profile curve of the surface. The in-plane-direction magnification was set at in the order of 10 to 50 thousand times, and the height-direction magnification was set at in the order of a million times.

(6) Characteristic of Magnetic Tape

Regarding the magnetic tape (MICRO MV tape), recording was performed using a commercially available MICRO MV system camcorder (MICRO MV camcorder) in a silent room, playback is performed for one minute, and the number of block-like mosaics (the number of dropouts (DOs)) displayed on the screen was counted, and thereby, the characteristic of the magnetic tape was evaluated.

First, an initial characteristic after preparation of the tape was examined at ambient temperature (25° C.), and this was defined as the initial number of DOs. Next, playback along the length thereof was repeated 200 times, and the number of DOs at the 200th time was measured. Furthermore, the noise level, running durability, and abrasion characteristic with respect to the playback head of the MICRO MV tape were evaluated.

The present invention will be described below with reference to examples.

Example 1

A raw material A of polyethylene terephthalate containing substantially no inert particle and a raw material B containing the same polyethylene terephthalate and 0.20% by weight of aluminum silicate having an average particle diameter of 300 nm were co-extruded at a thickness ratio of 5:1. A sheet was formed by adhesion to a cooling drum, and longitudinal drawing by a factor of 3.0 was performed at 110° C. using a rolling method.

In a step following the longitudinal drawing, the outside of the one-side surface A was coated with an aqueous solution having the following composition in order to achieve the solid application amount of 16 mg/m². Aqueous solution applied to the outside of surface A:

| | |
|---|---|
| methyl cellulose | 0.05% by weight |
| fluorine-based surfactant (mixture of $\alpha$-perfluorononenyloxy-$\omega$-methylpolyethyleneoxide/ potassium fluoride/ethylene glycol mono-t-butyl ether = 10/0.3/60% by weight) | 0.002% by weight |
| amino-modified silicone | 0.01% by weight |
| polystyrene balls having an average particle diameter of 23 nm (glass transition temperature: 107° C., solids: 10% by weight, emulsion state) | 0.034% by weight |

Subsequently, transverse drawing by a factor of 4.2 was performed at 110° C. using a stenter, a heat treatment was performed at 215° C., followed by winding around an intermediate spool, slitting was performed with a slitter so as to have a small width, followed by taking up around a cylindrical core into the shape of a roll, and therefore, a polyester film of 6.3 $\mu$m thickness was prepared.

A cobalt-oxygen thin film was provided on the coating of the surface A of this polyester film by vapor evaporation so as to have a film thickness of 50 nm. The cobalt-oxygen thin film layer was coated with a diamond-like carbon film having a thickness of 10 nm by a sputtering method, and subsequently, a fluorine-containing fatty acid ester-based lubricant of 3 nm thickness was applied thereon. A back coat layer of 500 nm thickness composed of carbon black, polyurethane and silicone was provided on the surface B. Slitting was performed with a slitter so as to have a width of 3.8 mm, followed by taking up around a reel, and therefore, a magnetic tape (MICRO MV tape) was prepared.

The characteristics of the resulting polyester film and magnetic tape are shown in Table 1. The Ra value of the surface B of the polyester film was 20 nm.

Example 2

In the preparation of the base film of Example 1, the polystyrene balls in the aqueous solution applied to the outside of surface A was changed to poly(methyl methacrylate) balls having an average particle diameter of 50 nm (glass transition temperature: 118° C., solids: 40% by weight, emulsion state), and the temperature during the transverse drawing was changed to 122° C. In a manner similar to that in Example 1 except for the above-mentioned conditions, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Example 3

In the preparation of the base film of Example 1, polyethylene terephthalate was changed to polyethylene-2,6-naphthalate, the content of aluminum silicate in the raw material B was changed to 1.1% by weight, the longitudinal drawing temperature and magnification were changed to 135° C. and 5.0 times, the solid application amount was changed to 50 mg/m², the transverse drawing temperature and magnification were changed to 135° C. and 6.5 times, and the heat treatment was performed at 200° C. In a manner similar to that in Example 1 except for the above-mentioned conditions, a polyester film of 4.8 μm thickness was prepared. A magnetic tape of 3.8 mm width (MICRO MV tape) was prepared from the resulting polyester film in a manner similar to that in Example 1. The characteristics of the resulting polyester film and magnetic tape are shown in Table 1. The Ra value of the surface B of the polyester film was 22 nm.

Example 4

In the preparation of the base film of Example 1, the temperature during the drawing in the transverse direction was changed to 103° C. In a manner similar to that in Example 1 except for the above-mentioned condition, a polyester film of 6.3 μm thickness was prepared, and a magnetic tape of 3.8 mm width was prepared. The characteristics of the resulting polyester film and magnetic tape (MICRO MV tape) are shown in Table 1. The Ra value of the surface B of the polyester film was 20 nm.

Example 5

In the preparation of the base film of Example 1, the concentration of the polystyrene balls in the aqueous solution for application was changed to 0.080% by weight. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Example 6

In the preparation of the base film of Example 1, the concentration of methyl cellulose in the aqueous solution for application was changed to 0.06% by weight, and the concentration of the fluorine-based surfactant was changed to 0.0005% by weight. In a manner similar to that in Example 1 except for the above-mentioned conditions, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Example 7

In the preparation of the base film of Example 1, the concentration of the fluorine-based surfactant in the aqueous solution for application was changed to 0.019% by weight. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 1

In the preparation of the base film of Example 1, the average particle diameter of the polystyrene balls in the aqueous solution for application was changed to 10 nm. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 2

In the preparation of the base film of Example 1, the average particle diameter of the polystyrene balls in the aqueous solution for application was changed to 65 nm. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 3

In the preparation of the base film of Example 1, the concentration of methyl cellulose in the aqueous solution for application was changed to 0.003% by weight, the concentration of the fluorine-based surfactant was changed to 0.0006% by weight, and silicone was not contained in the aqueous solution for application. In a manner similar to that in Example 1 except for the above-mentioned conditions, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 4

In the preparation of the base film of Example 1, the concentration of methyl cellulose in the aqueous solution for application was changed to 0.20% by weight, and the concentration of the fluorine-based surfactant was changed to 0.003% by weight. In a manner similar to that in Example 1 except for the above-mentioned conditions, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of

Comparative Example 5

In the preparation of the base film of Example 1, the concentration of the polystyrene balls in the aqueous solution for application was changed to 0.013% by weight. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 6

In the preparation of the base film of Example 1, the concentration of the polystyrene balls in the aqueous solution for application was changed to 0.080% by weight. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 7

In the preparation of the base film of Example 1, the concentration of methyl cellulose in the aqueous solution for application was changed to 0.02% by weight. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

Comparative Example 8

In the preparation of the base film of Example 1, the concentration of methyl cellulose in the aqueous solution for application was changed to 0.09% by weight. In a manner similar to that in Example 1 except for the above-mentioned condition, a polyester film of 6.3 μm thickness was prepared, and a magnetic tape of 3.8 mm width (MICRO MV tape) was prepared. The characteristics of the resulting polyester film and magnetic tape are shown in Table 1. The Ra value of the surface B of the polyester film was 20 nm.

TABLE 1

| | Coating layer | | Characteristics of surface of coating layer | | | | | Characteristics of magnetic tape Number of DOs | |
|---|---|---|---|---|---|---|---|---|---|
| | Weight ratio of fine particles: organic compounds | Weight ratio of cellulose derivative: fluorine-based surfactant in organic compounds | Number of surface protrusions (per square millimeter) | Number of surface protrusions having heights of 20 nm or more (per square millimeter) | Degree of aggregation of surface protrusions (%) | Diameter of surface protrusion (nm) | Surface roughness Ra (nm) | Initial (per minute) | After 200th running (per minute) |
| Example 1 | 1:1.8 | 100:4 | 50 million | 0 | 1 | 30 | 1.4 | 0 | 0 |
| Example 2 | 1:1.8 | 100:4 | 30 million | 0 | 1 | 55 | 1.4 | 0 | 0 |
| Example 3 | 1:1.8 | 100:4 | 42 million | 0 | 1 | 30 | 1.5 | 0 | 0 |
| Example 4 | 1:1.8 | 100:4 | 52 million | 2400 | 2 | 30 | 1.6 | 5 | 5 |
| Example 5 | 1:0.78 | 100:4 | 78 million | 0 | 50 | 30 | 1.6 | 0 | 5 |
| Example 6 | 1:0.33 | 100:0.8 | 50 million | 0 | 2 | 30 | 1.4 | 6 | 6 |
| Example 7 | 1:2.1 | 100:38 | 50 million | 0 | 2 | 30 | 1.4 | 0 | 7 |
| Comparative example 1 | 1:1.8 | 100:4 | 50 million | 0 | 1 | 15 | 1.4 | 0 | 15 |
| Comparative example 2 | 1:1.8 | 100:4 | 50 million | 0 | 1 | 70 | 1.4 | 20 | 23 |
| Comparative example 3 | 1:0.11 | 100:20 | 48 million | 1200 | 40 | 30 | 1.4 | 13 | 15 |
| Comparative example 4 | 1:6.26 | 100:1.5 | 47 million | 0 | 1 | 30 | 1.9 | 0 | 13 |
| Comparative example 5 | 1:4.8 | 100:4 | 2 million | 0 | 1 | 30 | 0.7 | 0 | 20 |
| Comparative example 6 | 1:0.78 | 100:4 | 122 million | 0 | 7 | 30 | 1.7 | 24 | 25 |
| Comparative example 7 | 1:0.94 | 100:10 | 52 million | 0 | 3 | 30 | 0.4 | 0 | 23 |
| Comparative example 8 | 1:3.0 | 100:2.2 | 52 million | 0 | 3 | 30 | 2.1 | 17 | 20 |

As is clear from the characteristics shown in Table 1, dropout (DO) hardly occurred in the magnetic tape (MICRO MV tape) prepared using the polyester film according to the present invention. Even when the magnetic tape (MICRO MV tape) prepared using the polyester film according to the present invention was repeatedly run, the number of DOs was less than 10 per minute, no abrasion of the MR head occurred, and therefore, the magnetic tape prepared using the polyester film according to the present invention was a MICRO MV tape having excellent image quality and running durability.

What is claimed is:

1. A polyester film comprising a coating layer which comprises organic fine particles, a cellulose derivative and a fluorine-based surfactant on one-side surface of the polyester film, the weight ratio of the organic fine particles to the cellulose derivative and fluorine-based surfactant in the coating layer is 1:0.2 to 1:5.0, the diameters of surface protrusions on the surface of the coating layer are 20 to 60 nm, the number of surface protrusions on the surface of the coating layer is 3 million to 100 million per square millimeter, and the surface roughness Ra of the surface of the coating layer is 0.5 to 1.9 nm.

2. The polyester film according to claim 1, wherein the number of surface protrusions having heights of 20 nm or more on the coating layer surface is 1,000 per square millimeter or less.

3. The polyester film according to claim 1, wherein the degree of aggregation of the surface protrusions is less than 10%.

4. The polyester film according to claim 1, wherein the surface protrusions on the surface of coating layer are fine surface protrusions having heights of less than 20 nm.

5. The polyester film according to claim 1, wherein the weight ratio of the cellulose derivative to the fluorine-based surfactant in the coating layer is 100:1 to 100:25.

6. The polyester film according to claim 1, wherein the polyester is polyethylene terephthalate or polyethylene-2,6-naphthalate.

7. The polyester film according to claim 1, which is a polyester film for a recording medium.

8. The polyester film for a recording medium according to claim 7, which is a polyester film for a magnetic recording medium.

9. The polyester film for a magnetic recording medium according to claim 8, which is used for a magnetic tape of a digital recording system.

10. The polyester film for a recording medium according to claim 7, which is a polyester film for an optical recording medium.

11. A recording tape comprising a ferromagnetic metal thin layer on the coating layer of the one-side surface of the polyester film according to claim 1.

12. A recording tape comprising an alloy thin layer for image data recording on the coating layer of the one-side surface of the polyester film according to claim 1.

* * * * *